US009167171B2

(12) United States Patent
Muraki et al.

(10) Patent No.: US 9,167,171 B2
(45) Date of Patent: Oct. 20, 2015

(54) IMAGING APPARATUS HAVING A SYNCHRONOUS SHOOTING FUNCTION

(71) Applicant: CASIO COMPUTER CO., LTD., Shibuya-ku, Tokyo (JP)

(72) Inventors: Jun Muraki, Hamura (JP); Kazuto Yamamoto, Akishima (JP); Hideaki Matsuda, Tokyo (JP); Hiroyuki Kato, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 85 days.

(21) Appl. No.: 14/179,362

(22) Filed: Feb. 12, 2014

(65) Prior Publication Data

US 2014/0226058 A1 Aug. 14, 2014

(30) Foreign Application Priority Data

Feb. 14, 2013 (JP) .................. 2013-026395

(51) Int. Cl.
*H04N 5/222* (2006.01)
*H04N 9/73* (2006.01)
*H04N 5/232* (2006.01)
*G03B 9/70* (2006.01)
*G03B 15/02* (2006.01)
*H04N 5/235* (2006.01)

(52) U.S. Cl.
CPC ............. *H04N 5/2353* (2013.01); *H04N 5/232* (2013.01)

(58) Field of Classification Search
CPC ... H04N 5/2357; H04N 5/235; H04N 5/2353; H04N 5/2354; H04N 13/0033; G03B 15/05; G03B 17/48; A61B 1/00006; A61B 1/045; A61B 1/0661

USPC .......... 348/211.1–211.99, 370–371, 159, 47, 348/48, 139; 396/155–206, 322–340
See application file for complete search history.

(56) References Cited

U.S. PATENT DOCUMENTS

| 5,006,871 A * | 4/1991 | Noble ............................. 348/64 |
| 6,933,956 B2 * | 8/2005 | Sato et al. .................... 345/690 |
| 7,046,292 B2 | 5/2006 | Ziemkowski |
| 7,084,901 B2 * | 8/2006 | Smith .......................... 348/143 |
| 2002/0154225 A1 * | 10/2002 | Matsumoto et al. ....... 348/229.1 |

(Continued)

FOREIGN PATENT DOCUMENTS

| JP | 2002-344800 | 11/2002 |
| JP | 2003-274251 | 9/2003 |
| JP | 2008252402 A | 10/2008 |

OTHER PUBLICATIONS

Japanese Office Action dated Jan. 14, 2015 (and English translation thereof), issued in counterpart Japanese Application No. 2013-026395.

*Primary Examiner* — Chia-Wei A Chen
(74) *Attorney, Agent, or Firm* — Holtz, Holtz, Goodman & Chick PC

(57) ABSTRACT

A camera is provided with an imaging element, and detects a timing of blinking of light which blinks periodically at a reference timing, based on a timing of variation in luminance of an image obtained by the imaging element, wherein the image is taken by the imaging element under a condition that the light blinks periodically at the reference timing. Further, the timing of exposure of the imaging element is adjusted based on the detected timing of the blinking light, thereby synchronizing shooting operations of plural cameras with each other.

26 Claims, 8 Drawing Sheets

(56) References Cited

U.S. PATENT DOCUMENTS

| | | | |
|---|---|---|---|
| 2006/0221192 A1* | 10/2006 | Nakajima et al. | 348/207.99 |
| 2006/0284992 A1* | 12/2006 | Kinoshita | 348/226.1 |
| 2007/0030460 A1* | 2/2007 | Mehrl | 353/79 |
| 2007/0040911 A1* | 2/2007 | Riley | 348/148 |
| 2007/0046789 A1* | 3/2007 | Kirisawa | 348/226.1 |
| 2007/0188449 A1* | 8/2007 | Choi et al. | 345/157 |
| 2007/0201856 A1* | 8/2007 | Ogasawara | 396/166 |
| 2009/0295906 A1* | 12/2009 | Kushimoto et al. | 348/36 |
| 2009/0303365 A1* | 12/2009 | Watanabe | 348/302 |
| 2011/0187920 A1* | 8/2011 | Shimada et al. | 348/371 |
| 2014/0198249 A1* | 7/2014 | Tanaka et al. | 348/370 |
| 2014/0340486 A1* | 11/2014 | Asano | 348/47 |

* cited by examiner

IMAGING APPARATUS HAVING A SYNCHRONOUS SHOOTING FUNCTION

CROSS-REFERENCE TO RELATED APPLICATION

The present application is based upon and claims the benefit of priority from the prior Japanese Patent Application No. 2013-026395, filed Feb. 14, 2013, the entire contents of which are incorporated herein by reference.

BACKGROUND OF THE INVENTION

1. Field of the Invention

The present invention related to cameras having a synchronous shooting function, and a recording medium having a program recorded thereon, the program being used in the cameras to control the shooting operation, and to a method of controlling the shooting operation.

2. Description of the Related Art

In the past, a moving-image shooting and reproducing method was known, which used plural cameras to shoot the same object using different camera angles to obtain plural moving images and reproduced the plural moving images in synchronization. This method is used among athletes (for example, golfers) to check their golf-club swinging forms. The golfer shoots plural flat images (two-dimensional images) using the different shooting angles and reproduces plural flat images in synchronization, whereby the golfer can see the reproduced moving image of his/her swinging motion in three dimensions. Observing the reproduced moving image, the golfer can check his/her swinging motion of the same moment in three dimensions and can sterically evaluate the motion of every moment.

To observe and evaluate object's motion of the same moment, it is required that the frames of the plural moving images to be reproduced are shot at a completely-matched time and the frames to be reproduced in synchronization are those shot simultaneously. In a camera system disclosed in Japanese Unexamined Patent Publication No. 2002-344800, all the cameras or the cameras excepting one camera are provided with a single light detecting means specified in detecting an optical signal and said means prepared separately from an imaging unit (photoelectric conversion device) in a light receiving unit. Further, the cameras are provided with signal controlling means for initializing the timings of frame synchronizing signals in response to detection of the optical signal, and the shooting operations of all the cameras are synchronized with each other, taking the generation of the optical signal as a cue.

SUMMARY OF THE INVENTION

According to one aspect of the invention, there is provided a camera, which comprises an imaging element for taking a picture to obtain an image, a detecting unit which detects a timing of blinking of light based on a timing of variation in luminance of an image obtained by the imaging element, wherein the light blinks periodically at a reference timing and the image is taken by the imaging element under a condition that the light blinks periodically at the reference timing, and an adjusting unit which adjusts a timing of exposure of the imaging element, based on the timing of blinking of light detected by the detecting unit.

According to another aspect of the invention, there is provided a method of controlling a shooting operation in a camera, which has an imaging element for taking a picture to obtain an image, the method comprises a step of detecting a timing of blinking of light based on timing of variation in luminance of an image obtained by the imaging element, wherein the light blinks periodically at a reference timing and the image is taken by the imaging element under a condition that the light blinks periodically at the reference timing; and a step of adjusting a timing of exposure of the imaging element based on the timing of blinking of light detected at the detecting step.

According to still another aspect of the invention, there is provided a camera system including plural cameras, each having an imaging element for taking a picture to obtain an image, wherein a particular camera among the plural cameras is provided with a light emitting unit for emitting light blinking periodically at a reference timing, and the plural cameras except the particular camera comprise a detecting unit which detects a blinking timing of light based on a timing of variation in luminance of an image obtained by the imaging element, wherein the light blinks periodically at reference timing and the image is taken by the imaging element under a condition of the light blinking periodically at the reference timing, and an adjusting unit which adjusts a timing of exposure of the imaging element, based on the timing of blinking of light detected by the detecting unit.

According to other aspect of the invention, there is provided a non-transitory computer-readable storage medium with an executable program stored thereon, wherein the program is for instructing a computer mounted on a camera, the camera has an imaging element for taking a picture to obtain an image, and when instructed by the program, the computer functions as a detecting unit which detects a timing of blinking of light based on a timing of variation in luminance of an image obtained by the imaging element, wherein the light blinks periodically at a reference timing and the image is taken by the imaging element under a condition that the light blinks periodically at the reference timing, and an adjusting unit which adjusts a timing of exposure of the imaging element, based on the timing of blinking of light detected by the detecting unit.

DETAILED DESCRIPTION OF THE PREFERRED EMBODIMENTS

Figure 1:
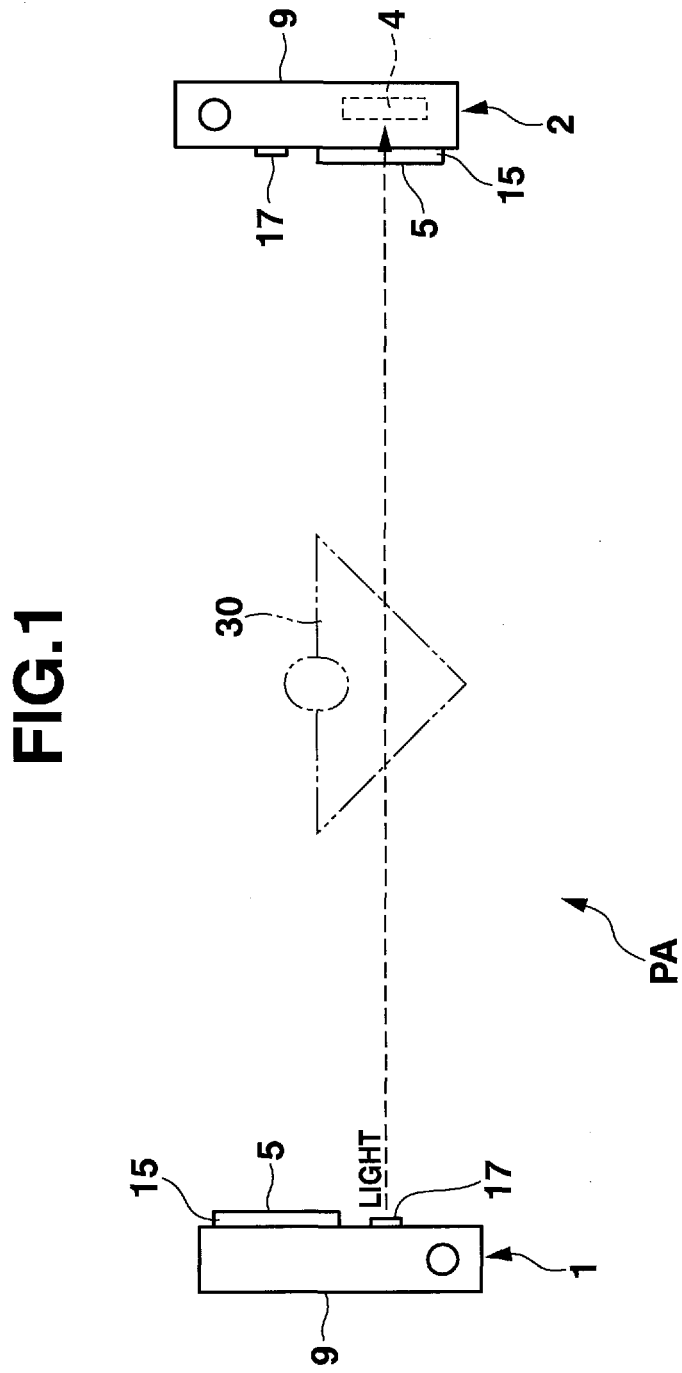
FIG. 1 is a plain view showing a camera system according to the embodiment of the invention.

Now, the embodiments of the present invention will be described with reference to the accompanying drawings in detail. FIG. 1 is a plain view showing a camera system according to the embodiment of the invention. The camera system comprises a master camera 1 and a slave camera 2, both disposed within a shooting area PA. The both cameras 1, 2 are placed face-to-face to each other during a shooting operation, and an object 30 (for instance, a golfer swinging a golf club) is arranged between the two cameras. Moving images of the object are shot from its both sides.

Figure 2:
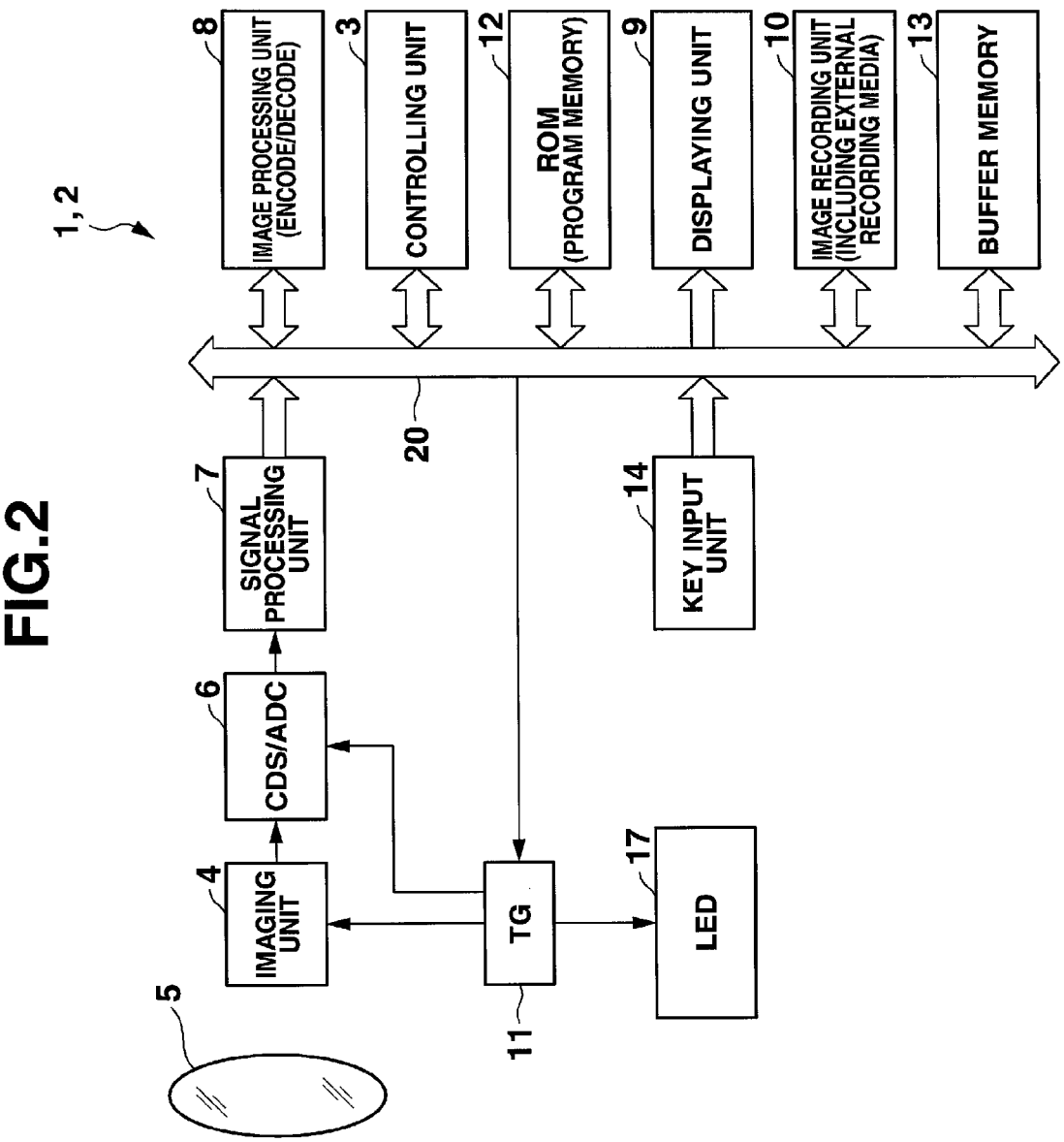
FIG. 2 is a block diagram showing a schematic configuration of a master and slave cameras.

FIG. 2 is a block diagram showing a schematic configuration of the cameras 1, 2. In the present embodiment of the invention, both the maser and slave cameras 1, 2 have the same configuration, as shown in FIG. 2. The cameras 1, 2 each have a controlling unit 3, which is connected with various units through a bus line 20. The controlling unit 3 is a one-chip microcomputer for controlling operations of the various units in the cameras 1, 2. An imaging unit 4 is composed of a CMOS image sensor and disposed on an optical axis of an imaging lens 5, which consists of a focusing lens and a zooming lens. The imaging unit 4 obtains and outputs an analogue imaging signal of an optical image of the object based on a line-exposure sequential-access method, in which exposure timings are different every scanning line.

A unit circuit 6 receives the analogue imaging signal of the optical image of the object from the imaging unit 4. The unit circuit 6 comprises CDS for holding the entered imaging signal, an automatic gain control amplifier (AGC) for amplifying the imaging signal, and an A/D converter (ADC) for converting the amplified imaging signal into a digital imaging signal. The output signal from the imaging unit 4 is sent as the digital signal to a signal processing unit 7 through the unit circuit 6.

The digital signal is subjected to various signal processes in the signal processing unit 7 and then sent to an image processing unit 8. The digital signal subjected to various signal processes is further subjected to various image processes in the image processing unit 8 and is displayed as a through image. The signal processed in the image processing unit 8 is further encoded to be recorded in an image recording unit (including external recording media) 10 during an image recording operation, and during an image reproducing operation, the image data is read from the image recording unit 10 and decoded to be displayed on a displaying unit 9.

To the bus line 20 are connected TG (Timing Generator) 11, ROM 12 and a buffer memory 13. TG 11 generates timings set by the controlling unit 3 and a frame synchronizing signal (sensor V synchronizing signal) of frame cycles set by the controlling unit 3. The imaging unit 4, the unit circuit 6 and LED 17 are driven based on the timings in accordance with the frame synchronizing signal. In ROM 12 are stored program AE data and an EV value table. The program AE data constitutes a program line map representing combinations of an aperture value (F) and a shutter speed corresponding to an exposure value (EV) appropriate for shooting a still image and/or moving image. The controlling unit 3 sets a shutter speed based on the program line map, and then an electric charge accumulating time is set based on the fixed shutter speed and is supplied as a shutter pulse to the imaging unit 4 through TG 11. The imaging unit 4 operates in accordance with the shutter pulses to control exposure periods and exposure timings. Further, in ROM 12 are stored a program for performing a process shown in a flow chart to be described later and a various sorts of programs for providing functions as a digital camera.

As shown in FIG. 1, LED 17 is mounted on the same external side of the camera body as the side on which a lens cylinder 15 with the built-in imaging lens 5 is provided. Therefore, when the two cameras 1, 2 are arranged face to face to each other as shown in FIG. 1, LED 17 of the master camera 1 can emit light to a range photographable by the slave camera 2 with its imaging lens 5.

The buffer memory 13 serves to temporarily store image data and is also used as a working memory of the controlling unit 3. In other words, the image processing unit 8 subjects Bayer pattern data sent from the signal processing unit 7 to processes including a pedestal clamp process, thereby converting the Bayer pattern data into RGB data. Further, the image processing unit 8 converts the RGB data into a luminance signal (Y signal) and color difference signals (UV signals). Data of one frame out of YUV data converted by the image processing unit 8 is stored in the buffer memory 13. YUV data of one frame stored in the buffer memory is sent to the displaying unit 9, and converted into a video signal to be displayed as a through image.

As shown in FIG. 1, the displaying unit 9 is mounted on the side opposite to the side where the imaging lens 5 is mounted.

In a still-image shooting mode, when a shutter-key operation by a user is detected, the controlling unit 3 switches the imaging unit 4 and the unit circuit 6 to a driving system and a driving timing for shooting a still image different from for shooting a thorough image, thereby implementing a still-image shooting process. In the still-image shooting process, the YUV data of one frame stored in the buffer memory 13 is subjected to data compression according to a JPEG method and then encoded. A file of the encoded data is created in the buffer memory 13, and is stored as still-image data in the image recording unit 10 through the bus line 20.

Further, in a moving-image shooting mode, when an instruction for starting a shooting operation is detected, the controlling unit 3 starts a shooting process and stores YUV data of plural frames in the buffer memory 13 before an instruction for finishing the shooting operation is detected. After the instruction for finishing the shooting operation has been detected, the YUV data of plural frames stored in the buffer memory 13 is subjected to data compression according to the JPEG method (in the case of shooting a moving image, a predetermined JPEG Codec) and encoded, and then is written as frame data with a filename in the image recording unit 10 through the buffer memory 13 and the bus line 20. In reproducing a still image or a moving image, the controlling unit 3 reads still-image data or moving-image data from the image recording unit 10 to expand them, and expands the still-image data or moving-image frame data on an image-data working area of the buffer memory 13.

Further, a key input unit 14 is connected to the bus line. The key input unit 14 comprises plural operation keys such as a shutter key, a mode setting key, and a power key. When operated by the user, the key input unit 14 detects a key input signal and outputs the key input signal to the controlling unit 3.

Figure 3:
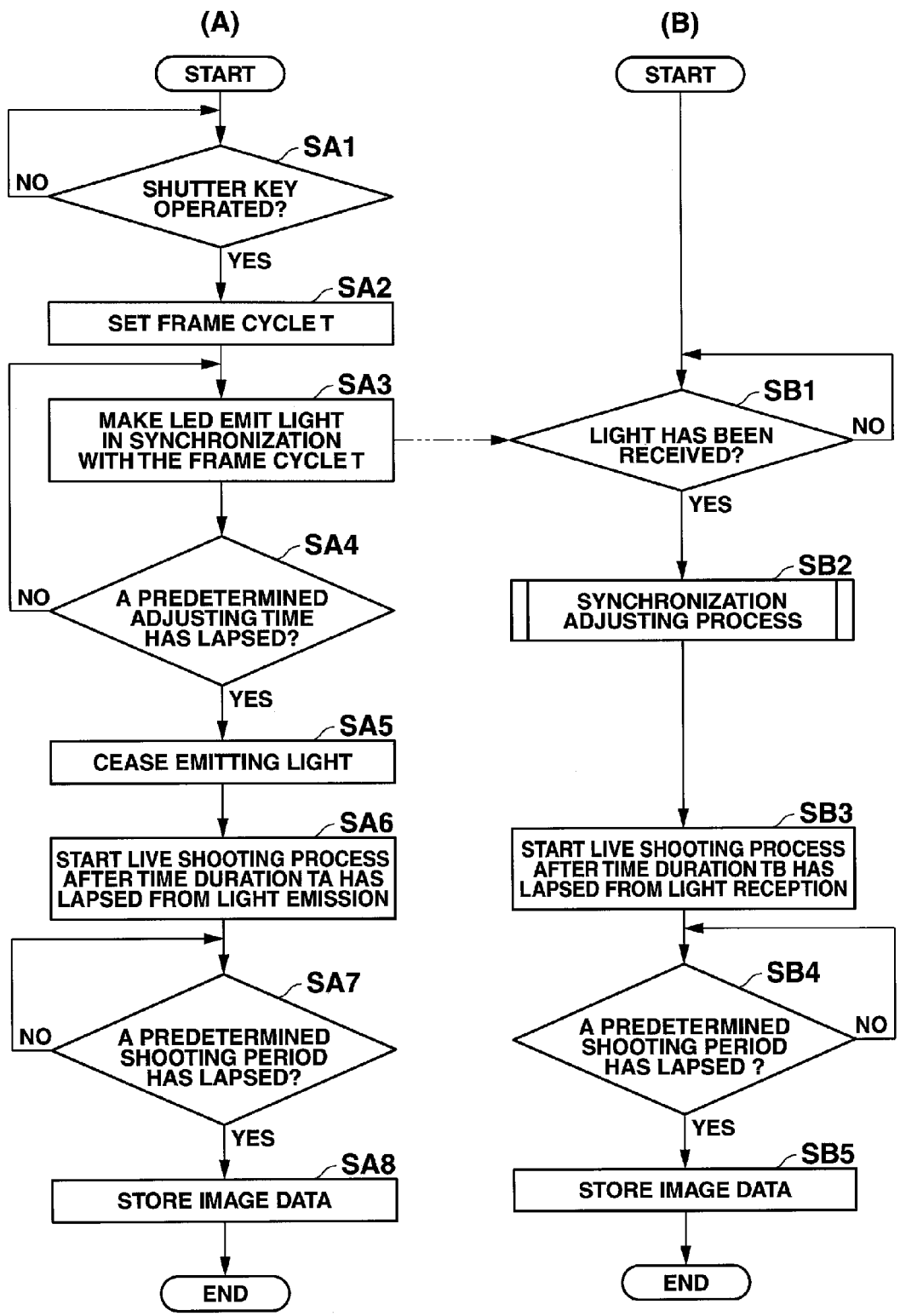
FIG. 3A is a flow chart of the process performed by the master camera in the synchronous shooting mode.
FIG. 3B is a flow chart of a process performed by the slave camera in the synchronous shooting mode.

In the camera system having the above configuration according to the present embodiment of the invention, when a synchronous shooting mode has been set by the user's operation on the key input unit 14, the controlling unit 3 of the master camera 1 operates in accordance with the program stored in ROM 12 to perform a process shown in a flow chart of FIG. 3A. FIG. 3A is the flow chart of the process performed by the master camera 1 in the synchronous shooting mode.

The controlling unit 3 watches the key input unit 14 at all times whether the same unit is operated or not, and judges whether the key input unit 14 has detected operation of the shutter key (step SA1 in FIG. 3A). Detecting the operation of the shutter key, the controlling unit 3 sets a frame cycle of the frame synchronizing signal (sensor V synchronizing signal) to be generated by TG 11 to a frame cycle T at a predetermined timing (step SA2). Then, TG 11 generates the frame synchronizing signal having the frame cycle T at the predetermined timing, and the controlling unit 3 drives the imaging unit 4, unit circuit 6 and LED 17 at the timing in accordance with the frame synchronizing signal and makes LED 17 execute a light emitting operation in synchronization with the frame cycle T of the frame synchronizing signal (step SA3).

It is possible for the user to previously decide which camera is to be used as the master camera or which cameras are to be used as the slave cameras. Further, the following selection is allowed, too, that is, in the case where plural cameras are set in the synchronous shooting mode, if one camera has detected an operation of the shutter key (step SA1) before receiving light from other camera, then said camera (detecting the operation of the shutter key) automatically serves as the master camera and this master camera will start emitting light. On the contrary, if one camera has received light from other camera (step SB1) before detecting an operation of the shutter key, then said camera (receiving light from other camera) will automatically serve as the slave camera. FIG. 3B is a flow chart of a process performed by the slave camera in the synchronous shooting mode.

FIG. 4A is a time chart showing an operation of the master camera and FIG. 4B to FIG. 4E are time charts showing an operation of the slave camera. In FIG. 4A, references L1, L3, L5, . . . indicate light emitting periods of LED 17. Therefore, the starting points of the respective light emitting periods L1, L3, L5, . . . will be light emitting timings. When LED 17 emits light at these light emitting timings, the number of light emitting operations per unit time will be the light emitting cycle. In FIG. 4A, references E1, E2, E3, E4, E5, . . . represent exposure periods of the imaging unit 4. Therefore, the starting points of the exposure periods E1, E2, E3, E4, E5, . . . will be exposure timings. When exposures are effected at these exposure timings by the imaging unit 4, then, the number of exposures per unit time will be an exposure cycle.

As shown in FIG. 4A, the frame synchronizing signal (sensor V synchronizing signal) of a frame cycle T is generated and the exposure periods, that is, sensor reading timings from the top to bottom ends of the imaging unit (CMOS image sensor) 4 are controlled depending on the frame cycle T of the frame synchronizing signal. LED 17 is controlled to emit light at the light emitting timings which completely conform to the exposure periods of the imaging unit 4. In other words, in the exposure periods E1, E2, E3, E4, E5, . . . at the horizontal center level between the top and bottom ends of the imaging unit 4, the every other exposure periods E1, E3, E5, . . . of the imaging unit 4 are made to conform completely to the light emitting periods L1, L3, L5, . . . of LED 17, as shown in FIG. 4A. The light emitting periods L1, L3, L5, . . . of LED 17 overlap with the adjacent frame cycles by one-half, respectively. Therefore, the light emitting periods L1, L3, L5, . . . of LED 17 will be an essential element which conforms to the exposure timings and exposure periods E1, E2, E3, E4, E5, . . . of the imaging unit 4.

The controlling unit 3 repeatedly performs the processes at step SA3 and step SA4 until it is determined that a predetermined adjusting time has lapsed (YES at step SA4). The predetermined adjusting time is a time required by the slave camera 2 to synchronize itself with the operation of the master camera 1. The predetermined adjusting time shall be experimentally acquired and stored in ROM 12 by a manufacturer of the master and slave cameras. The adjusting time will be described in detail later.

In the camera system according to the present embodiment, the controlling unit 3 watches whether the predetermined adjusting time has lapsed to confirm that the slave camera 2 is synchronized with the operation of the master camera 1, and after confirming that the slave camera 2 is synchronized with the operation of the master camera 1 (YES at step SA4), the controlling unit 3 advances to the following step SA5. But another arrangement can be employed, that is, the cameras 1, 2 are connected to each other through a short distance radio transmission technology such as Bluetooth (Registered Trademark) and upon receipt of a signal of synchronization adjustment establishment from the slave camera 2, then the master camera 1 advances from step SA4 to the following step.

After the predetermined adjusting time has lapsed (YES at step SA4), the controlling unit 3 makes the LED 17 cease emitting light in useless (step SA5). The process prevents LED 17 from emitting light in vain to disturb the moving image shooting operation to be performed in the following process.

Following to step SA5, at the time when a time duration TA has lapsed after the first light emission of LED 17 at step SA3, the controlling unit 3 starts a live shooting process (step SA6), wherein the time duration TA is counted by a built-in timer of the controlling unit 3. The live shooting process is a process for shooting to obtain frame image data in synchronization with the frame synchronizing signal having the frame cycle T generated at the timing set to TG 11 at step SA2 and for storing the frame image data in the buffer memory 13. More specifically, in the live shooting process, the frame image data is obtained at the timings and frame cycle T set in TG 11 by means of the imaging unit 4, unit circuit 6, and signal processing unit 7, and the obtained frame image data is serially stored in the buffer memory 13.

In the camera system according to the present embodiment, at the time when the time duration TA has lapsed after the first light emission of LED 17 at step SA3 or at the time when a time duration TB has lapsed after the first light reception from LED 17, plural cameras start the live shooting process, but another arrangement can be made, that is, the plural cameras communicate with each other through the short distance radio transmission technology, and start the live shooting process simultaneously. In the arrangement, when the user presses a shutter key of one camera out of the plural cameras, it is possible to send from said one camera to the other cameras through the short distance radio transmission technology an instruction for starting the live shooting process simultaneously. Further, it is also possible for the plural cameras to start the live shooting processes at respective separate timings according to the user's operation instead of starting the live shooting process at the same time. Even in this arrangement, the plural cameras are kept in synchronization in the timings and frame cycle of the frame synchronizing signal, and therefore, if an overlapping portion should be contained in plural pieces of frame image data continuously taken by the plural cameras, the shooting timings and shooting cycles will be synchronized among the plural cameras at least in such overlapping portion of frame image data, even though the plural cameras should start or finish the continuous shooting processes separately. Therefore, taking away the portion other than the overlapping portion of frame image data, it is easy to obtain plural pieces of moving image data which can be reproduced in synchronization.

The live shooting process can be applied not only for shooting a moving image but also for shooting a still image. In shooting a still image, since the frame synchronizing signal synchronized in the plural cameras is used for shooting still images, plural still images whose shooting timings are precisely coincident (difference in shooting timings is less than one frame cycle) can be obtained.

The live shooting process continues for a predetermined shooting period from the time when the time duration TA lapses after the first light emission of LED 17 (step SA7), and finishes after the predetermined shooting period. Thereafter, the image data (YUV data) of plural frames stored in the buffer memory 13 is compressed and encoded in an MPEG codec. The compressed and encoded frame image data is stored in the image recording unit 10 as a file having a file name (step SA8).

Meanwhile, the controlling unit 3 of the slave camera 2 runs a program stored in ROM 12 to perform a process in accordance with the flow chart of FIG. 3B. The controlling unit 3 generates the sensor V synchronizing signal having an appropriate frame cycle, and controls the sensor reading timings (from top to bottom ends) or the exposure periods of the imaging unit (CMOS image sensor) 4 based on the appropriate frame cycle of the sensor V synchronizing signal. The controlling unit 3 of the slave camera 2 judges depending on the exposure, whether light has been received from LED 17 of the master camera 1 (step SB1).

When it is determined that LED 17 of the master camera 1 has emitted light (YES at step SB1), a synchronization adjusting process is performed at step SB2. The synchronization adjusting process will be described with reference to the flow charts of FIG. 5 and FIG. 6 in detail later. When the synchronization adjusting process finishes, the controlling unit 3 starts a live shooting process at the time when the time duration TB has lapsed after the first light reception from LED 17 at step SB1 (step SB3). The time duration TB is counted by a built-in timer of the controlling unit 3 of the slave camera 2, and the time duration TB=the time duration TA, and the time duration TB is the same as the time duration TA. The live shooting process performed in the slave camera 2 is a process for shooting frame image data in synchronization with the frame synchronizing signal having the frame cycle T generated at the timing set in TG 11 (step SA2) and storing the frame image data in the buffer memory 13.

Both the live shooting process (step SA6) of the master camera 1 and the live shooting process (step SB3) of the slave camera 2 start at the same time. In the live shooting process (step SB3) of the slave camera 2, the frame image data of the previously set frame cycle T is obtained through the imaging unit 4, unit circuit 6 and signal processing unit 7, and serially stored in the buffer memory 13.

The live shooting process continues for a predetermined shooting period from the time when the time duration TB (=TA) lapses after the first light reception from LED 17 (step SB4), and finishes after the predetermined shooting period. Thereafter, the image data (YUV data) of plural frames stored in the buffer memory 13 is compressed and encoded in an MPEG codec. The compressed and encoded frame image data is stored in the image recording unit 10 as a file having a file name (step SB5).

Figure 5:
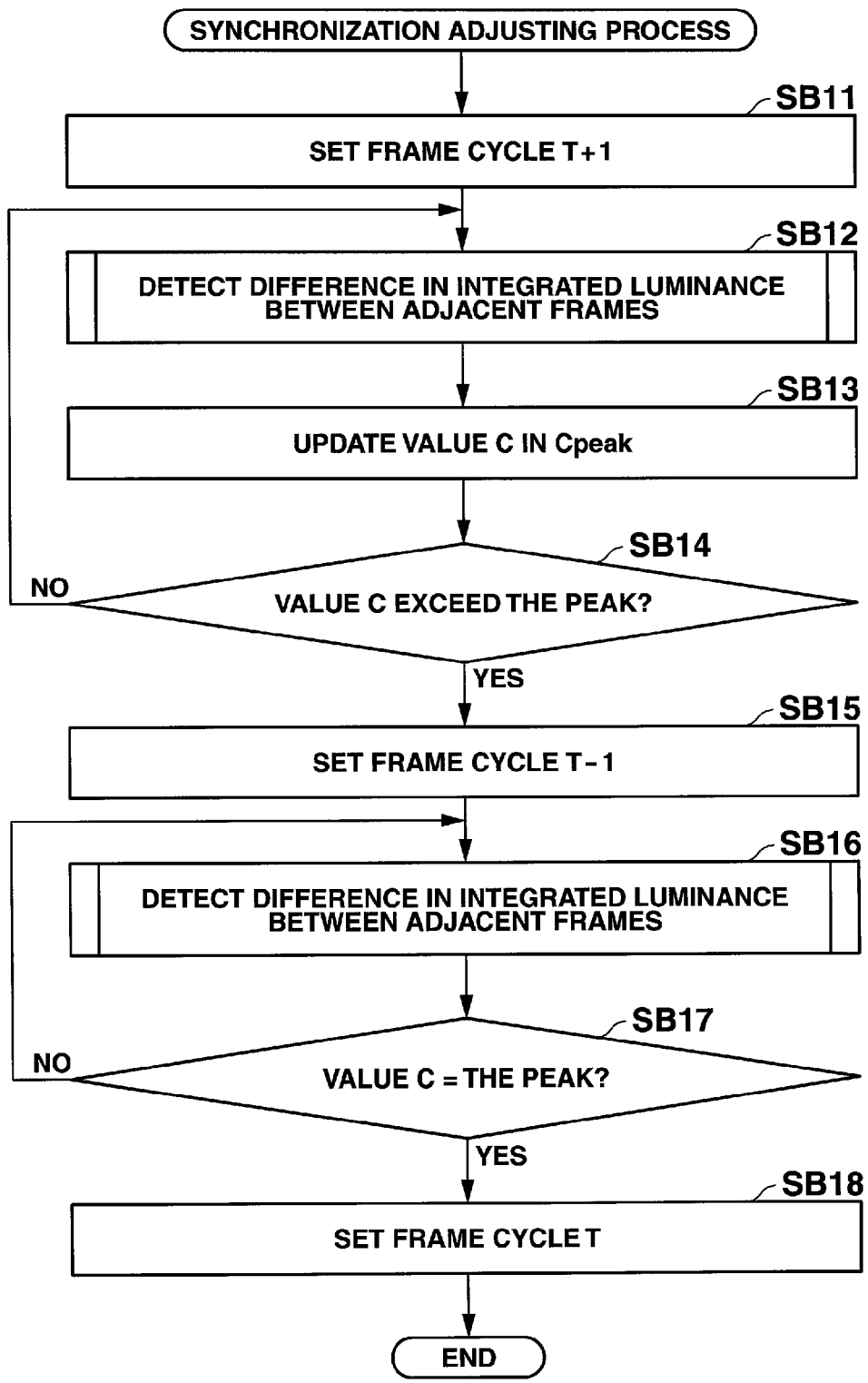
FIG. 5 is a flow chart of a synchronization adjusting process.

FIG. 5 is a flow chart of the synchronization adjusting process to be performed at step SB2. The controlling unit 3 of the slave camera 2 sets in TG 11 a frame cycle T+1, which is a little longer than the frame cycle T set in the master camera 1 (step SB11). Then, the controlling unit 3 detects a difference in integrated luminance between the temporally adjacent frames (step SB12).

Figure 6:
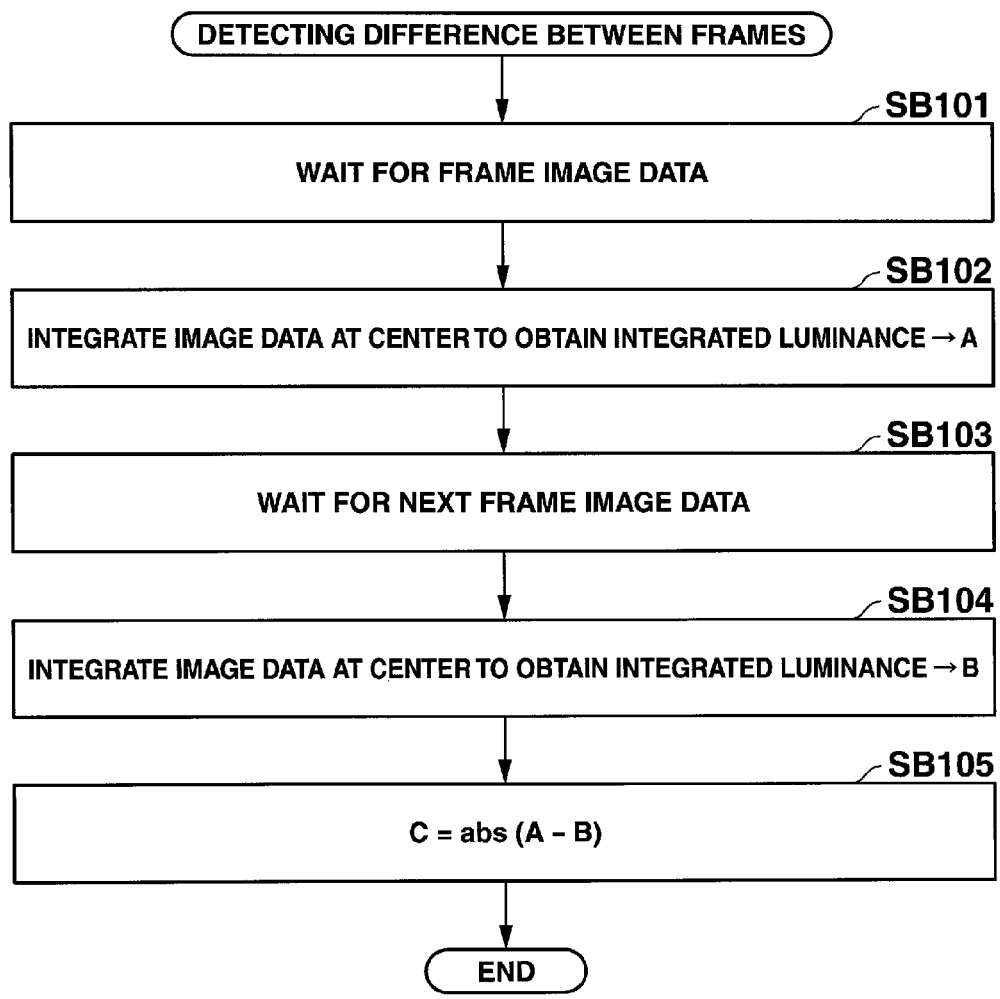
FIG. 6 is a flow chart showing a detailed process of detecting a difference in integrated luminance between the temporally adjacent frames.

FIG. 6 is a flow chart of a detailed process of detecting a difference in integrated luminance between the temporally adjacent frames. The controlling unit 3 waits for transmission of frame image data (hereinafter, refer to as the "previous frame") generated by the imaging unit 4 at the frame cycle T+1 set to TG 11 (step SB101 in FIG. 6). Upon receipt of the "previous frame", the controlling unit 3 integrates a luminance value of plural pixels contained in a line image at the center line of the "previous frame" to obtain an integrated luminance value (or a luminance average value), and uses the integrated luminance value as a variable A (step SB102).

Further, the controlling unit 3 waits for next transmission of frame image data (hereinafter, refer to as the "following frame") generated at the frame cycle T+1 by the imaging unit 4, following the "previous frame" (step SB103). Upon receipt of the "following frame", the controlling unit 3 integrates a luminance value of plural pixels contained in a line image at the center line of the "following frame" to obtain an integrated luminance value, and uses the integrated luminance value as a variable B (step SB104). Then, the controlling unit 3 calculates a difference between the variables A and B, and uses the calculated difference as a variable C (step SB105), finishing the process of detecting a difference in integrated luminance between the temporally adjacent frames.

When the process (shown by the flow chart of FIG. 6) has been performed at step SB12 in FIG. 5, then the controlling unit 3 of the slave camera 2 advances to step SB13 to store the calculated difference C in a register Cpeak, and thereafter, serially updates the value C in the register Cpeak (step SB13).

Thereafter, the controlling unit 3 judges whether the difference C stored in the register Cpeak has exceeded the peak value (step SB14). The above judgment, that is, judging whether or not the difference C has exceeded the peak value can be made based on the value of the difference C. In other words, while the difference C is a minus value, the difference C has not exceeded the peak value, and it is determined that the difference C has exceeded the peak value at the time when the difference C changes from the minus value to a positive value.

Figure 4:
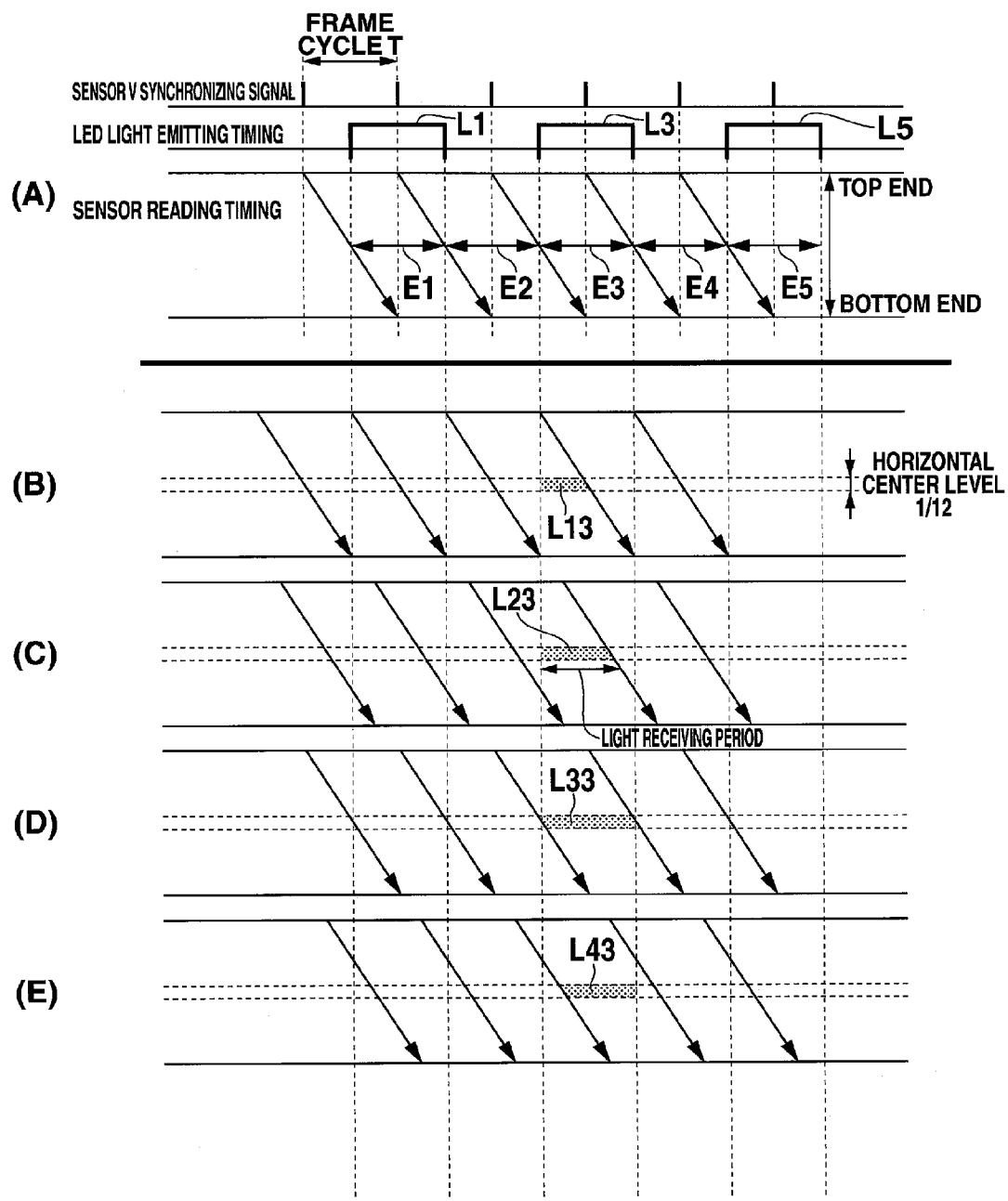
FIG. 4A is a time chart showing an operation of the master camera.
FIG. 4B to FIG. 4E are time charts showing operations of the slave camera.

The synchronization adjusting process will be described with reference to the light receiving periods shown in FIG. 4B to FIG. 4E. It is presume that the light receiving period is given by a time-length L13 in the slave camera 2 as shown in FIG. 4B. LED 17 of the master camera 1 emits light in synchronization with the frame cycle T as shown in FIG. 4A and meanwhile the imaging unit 4 of the slave camera 2 exposes at the timing of the frame cycle T+1. Therefore, as shown in FIG. 4B and FIG. 4, the timings of receiving light from LED 17 are different respectively in the exposure period (FIG. 4B) and the next exposure period (FIG. 4C) of the slave camera 2. As a result, the light receiving period L23 in the next exposure period (FIG. 4C) can be longer than the light receiving period L13 in the previous exposure period (FIG. 4B). The difference C=A−B=L13−L23 will be a minus value. Similarly, the light receiving period L33 in the following exposure period (FIG. 4D) can be longer than the light receiving period L23 in the previous exposure period (FIG. 4C). As a result, the difference C=A−B=L23−L33 will be a minus value.

While the slave camera 2 stays in the states shown in FIG. 4B to FIG. 4D, the difference C shows a minus value, and therefore, the value C in the register Cpeak has not yet exceeded the peak and it is determined NO at step SB14.

But the light receiving period L43 in the exposure period (FIG. 4E) can be shorter than the light receiving period L33 in the previous exposure period (FIG. 4D). That is, the difference C=A−B=L33−L43 will be a plus value. Therefore, since the difference C changes from a minus value to a plus value in the exposure period (FIG. 4E), it is determined that the difference C has exceeded the peak (YES at step SB14), and the controlling unit 3 advances to step SB15.

Then, the controlling unit 3 sets the frame cycle to "T−1", which is a little shorter than the frame cycle T of the master camera 1 (step SB15), and advances to step SB16. Then, the process performed at step SB12 in accordance with the flow chart of FIG. 6 is performed again (step SB16). Further, the controlling unit 3 judges whether the difference C obtained currently has become equivalent to the difference C stored in the register Cpeak (step SB17). The process is repeatedly performed (step SB16) until the obtained difference C has become equivalent to the difference C stored in the register Cpeak. When it is determined that the obtained difference C has become equivalent to the difference C stored in the register Cpeak (YES at step SB17), the controlling unit 3 of the slave camera 2 sets the frame cycle of TG 11 to "T", which has been set to TG 11 in the master camera 1 (step SB18).

More specifically, when the obtained difference C has become equivalent to the difference C stored previously in the register Cpeak (YES at step SB17), the following logic will be true and the slave camera 2 will be brought into the following state:

(1) The exposure timing of the slave camera 2 and the light emitting timing of the master camera 1 are the same (an inconsistency between the exposure timing and the light emitting timing will be minimum).
(2) The light emitting timing of the master camera 1 and the exposure timing of the master camera 1 are the same.
(3) Since the terms (1) and (2) are true, the exposure timing of the slave camera 2 and the exposure timing of the master camera 1 are the same. As a result, "the timing of the frame synchronizing signal of the slave camera 2 and the timing of the frame synchronizing signal of the master camera 1 are the same."
(4) In the slave camera 2, the frame cycle of the frame synchronizing signal is set to "T". Therefore, the frame synchronizing signals respectively in the master and slave cameras 1 and 2 have the same frame cycle "T".

On the basis of the terms (3) and (4), the shooting operations of the master and slave cameras 1 and 2 can be synchronized both in terms of timing and cycle. Using the integrated luminance value (or luminance average value) obtained by integrating a luminance value of plural pixels contained in a line image and based on the light emitting operation and exposure operation performed plural times, both the master and slave cameras 1 and 2 are synchronized in their operations. Therefore, the synchronous shooting operations of both master and slave cameras 1 and 2 will not be disturbed by incidental disturbance and secure certainty of synchronization. Using inconsistency between the exposure period and light emitting period varying little by little with time due to fine inconsistency in the exposure timing and/or frame cycle of one (slave camera 2) of the cameras, the timings of operations of both the master and slave cameras 1 and 2 are fine-controlled, thereby enhancing a precise synchronization in operations of the master and slave cameras 1 and 2.

Both the master and slave cameras 1 and 2 use an imaging element, which performs line exposure with a timing shifted by a predetermined time per line within one frame to output line images and are synchronized based on variation in luminance of the line image of a specific line in one frame. Therefore, both the master and slave cameras 1 and 2 are not synchronized roughly in unit of a frame cycle but can be precisely synchronized in unit of a line cycle. In other words, plural cameras can be precisely synchronized in shooting operation without failure, thereby enhancing both certainty and accuracy in synchronization of operation.

Since there is no need to provide on the camera an optical sensor specified in detecting an optical signal, separately from the imaging unit (photoelectric conversion device), the number of parts to be installed in the electronic circuits can be reduced, contributing to a reduction in manufacturing costs and also to a production of compact devices.

As described above, it is judged at step SB17 whether the difference obtained currently has become exactly equivalent to the maximum difference stored in the register Cpeak. But it will be possible to judge whether the difference obtained currently has become substantially equivalent to the maximum difference stored in the register Cpeak. Because there are limitations to a human sense of vision and ability of discriminating an image, and therefore, the above judgment will pose no problem.

In other words, in the embodiment of the invention, the exposure timing of the imaging unit 4 is controlled such that the detected difference in time between the light emitting period of LED 17 and the exposure period of the imaging unit 4 will be "0". But it will be acceptable to control the exposure timing of the imaging unit 4 such that the above detected difference in time will be a predetermined time or less.

When the synchronization adjusting process (step SB2) finishes, the controlling unit 3 starts the live shooting process at the time when the time duration TB has lapsed after the light reception from LED 17 (step SB3), wherein the time duration TB is counted by the built-in timer of the controlling unit 3 of the slave camera 2 and is equivalent to the time duration TA counted by the built-in timer of the controlling unit 3 of the master camera 1.

The live shooting process of the slave camera 2 is performed for obtaining frame image data at the frame cycle T set to TG 11 at step SB18 and serially storing the frame image data in the buffer memory 13. In other words, when the live shooting process is performed by the slave camera 2, the frame image data is obtained at the pre-set frame cycle T through the imaging unit 4, unit circuit 6 and signal processing unit 7, and the obtained frame image data is serially stored in the buffer memory 13.

The live shooting process continues for the predetermined shooting period from the time when the time duration TB (=TA) lapses after the first light reception from LED 17 (step SB4), and finishes after the predetermined shooting period. Thereafter, the image data (YUV data) of plural frames stored in the buffer memory 13 is compressed and encoded in an MPEG codec. The compressed and encoded frame image data is stored in the image recording unit 10 as a file having a file name (step SB5).

As a result, in the image recording units 10, 10 of the respective cameras 1, 2 are stored the moving image data shot by the master camera 1 and the moving image data shot by the slave camera 2, respectively. These pieces of moving image data are shot under the conditions that the exposure timings of the slave camera 2 and the light emitting timings of the master camera 1 are synchronized with each other, both the frame synchronizing signals of the master and slave cameras 1, 2 have the frame cycle "T", and the timings of the frame synchronizing signals coincide with each other, as described in the terms of (3) and (4). Therefore, frame images composing the moving image data coincide with each other precisely in time, and plural sorts of moving image data can be recorded, which are obtained by shooting the object 30 or a golfer swinging a golf club precisely at the same timing using different angles.

When the synchronous shooting operations have finished as described above, all the plural pieces of moving image data shot by the respective cameras 1, 2 are read into one and the same moving-image reproducing apparatus by replacing memory cards having the moving image data recorded thereon or radio or wireless data communication. Then the plural pieces of moving image data can be reproduced in synchronization on the one and same moving-image reproducing apparatus.

When the plural pieces of moving image data shot by the master and slave cameras 1, 2 respectively are reproduced, not only the frame numbers of the frames of the both pieces of moving image data, which are being reproduced, coincide with each other, but also the shooting timings of these frames precisely coincide with each other. Therefore, in a frame-by-frame playback and/or in a slow-motion playback, a motion of the golfer swinging a golf-club at a his or her desired moment can be precisely compared.

Even if a moving-image reproducing apparatus is not available, which has a function of playing back plural pieces of moving image data disposed side by side on a screen simultaneously, the following method makes it possible to playback the plural pieces of moving image data simultaneously with plural cameras used to shoot such moving image data.

Figure 7:
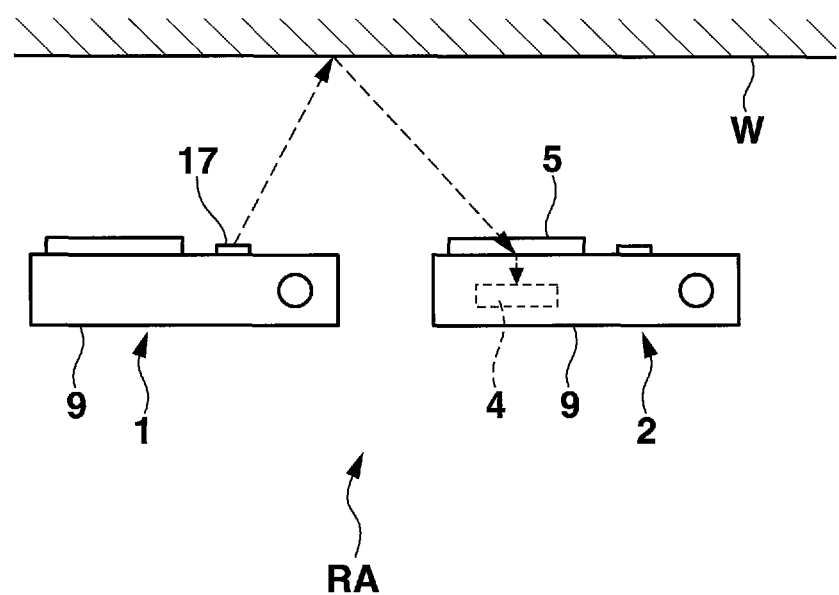
FIG. 7 is a view showing an example of a setup of the camera system in a reproducing mode.

More specifically, when the synchronous shooting operation has finished, the master and slave cameras 1, 2 are moved from the shooting area PA shown in FIG. 1 to a reproducing area RA as shown in FIG. 7. FIG. 7 is a view showing an example of a setup of the camera system in a reproducing mode. In the reproducing area RA, there is provided a wall W of a high reflection rate as shown in FIG. 7, and the both cameras 1, 2 are disposed with the imaging lens 5 and LED 17 facing the wall W, allowing the user to watch the displaying units 9, 9.

Figure 8A:
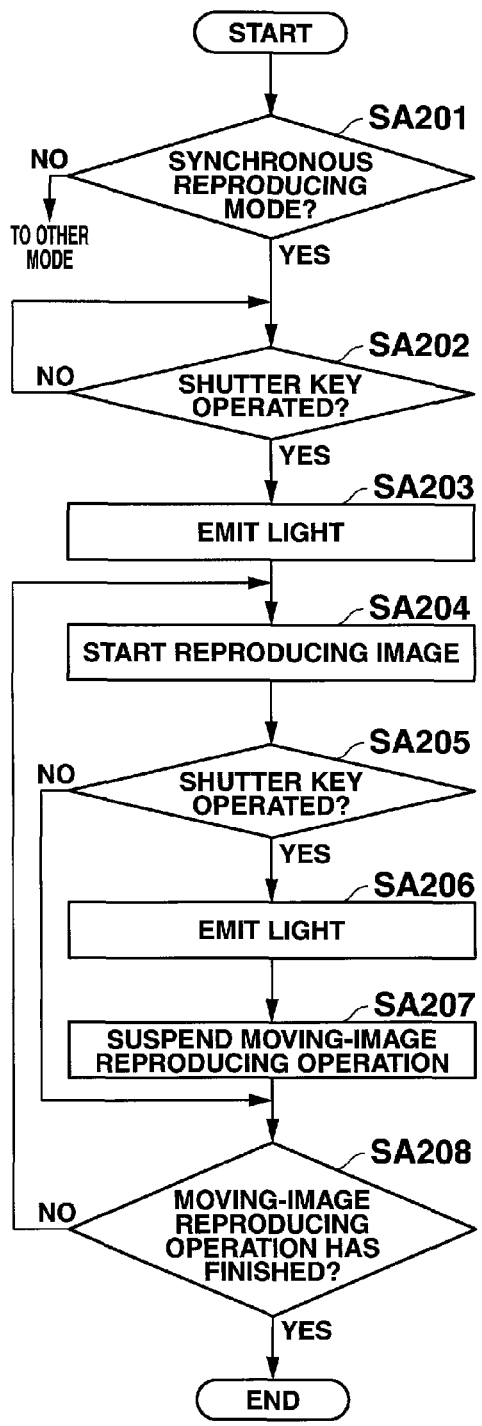
FIG. 8A is a flow chart of a process performed by the master camera in a synchronous reproducing mode.

FIG. 8A is a flow chart of a process performed by the controlling unit 3 of the master camera 1 in a synchronous reproducing mode. The controlling unit 3 judges whether the synchronous reproducing mode has been set (step SA201). When it is determined that other mode has been set (NO at step SA201), then the controlling unit 3 performs a process in such other mode.

When it is determined that the synchronous reproducing mode has been set (YES at step SA201), the controlling unit 3 judges whether the shutter key has been operated (step SA201). When it is determined that the shutter key has been operated (YES at step SA201), the controlling unit 3 drives and makes LED 17 emit light by means of TG 11 (step SA203). Meanwhile, at the same time, the controlling unit 3 starts reproducing the moving image data stored in the image recording unit 10 at step SA8 (step SA204). Since the moving image data is obtained during a predetermined shooting period from the time when the time duration TA has lapsed after the first light emission of LED 17, a moving image will be reproduced on the displaying unit 9 of the master camera 1 from the time when the time duration TA has lapsed after the first light emission of LED 17.

The controlling unit 3 of the master camera 1 watches a shutter key operation at all times during the moving-image reproducing period (step SA205). Detecting the shutter key operation (YES at step SA205), the controlling unit 3 drives and makes LED 17 emit light (step SA206), and suspends the moving-image reproducing operation (step SA207). Therefore, the user operates the shutter key when needed to suspend the moving-image reproducing operation and can check his/her golf-club swinging motion.

Thereafter, the controlling unit 3 judges whether the reproducing operation of the moving image data has finished (step SA208). When the reproducing operation of the moving image data has not yet finished (NO at step SA208), the controlling unit 3 repeatedly performs the processes at step SA204 to step SA208 until it is determined that the reproducing operation of the moving image data has finished (YES at step SA208). When it is determined that the reproducing operation of the moving image data has finished (YES at step SA208), the process of FIG. 8A finishes.

Figure 8B:
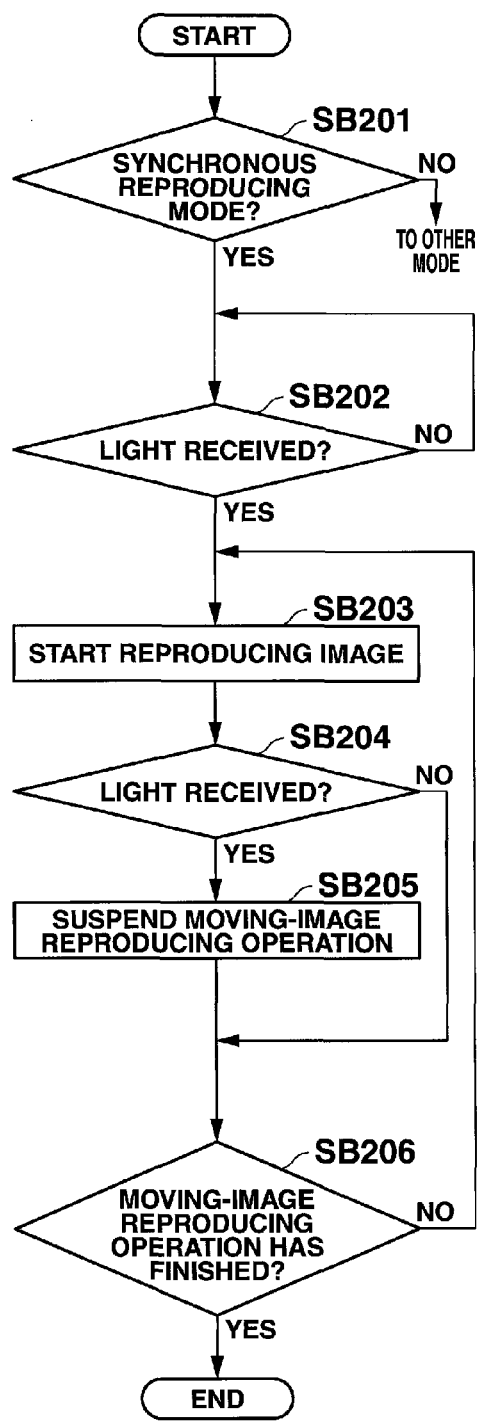
FIG. 8B is a flow chart of a process performed by the slave camera in the synchronous reproducing mode.

FIG. 8B is a flow chart of a process performed by the controlling unit 3 of the slave camera 2 in the synchronous reproducing mode. The controlling unit 3 judges whether the synchronous reproducing mode has been set (step SB201). When it is determined that other mode has been set (NO at step SB201), then the controlling unit 3 performs a process in such other mode.

When it is determined that the synchronous reproducing mode has been set (YES at step SB201), the controlling unit 3 judges whether light has been received from LED 17 of the master camera 1 (step SB202). When light is emitted from LED 17 of the master camera 1, the wall W reflects the light of LED 17 toward the slave camera 2. Then it is determined that the imaging unit 4 has received light from LED 17 of the master camera 1 (YES at step SB202), the controlling unit 3 of the slave camera 2 advances to step SB203 to start reproducing the moving image data stored in the image recording unit 10 at step SB8 (step SB204). Since the moving image data is obtained by the slave camera 2 during a predetermined shooting period from the time when the time duration TA has lapsed after the first light emission of LED 17 of the master camera 1, a moving image will be reproduced on the displaying unit 9 of the slave camera 2 from the time when the time duration TA has lapsed after the first light emission of LED 17.

Therefore, the user can evaluate his/her swinging motion in three dimensions at the same moment by observing both the moving image displayed on the displaying unit 9 of the master camera 1 and the moving image displayed on the displaying unit 9 of the slave camera 2.

The controlling unit 3 of the slave camera 2 watches whether the imaging unit 4 has received light form the master camera 1, at all times during the moving image reproducing period (step SB204). Then it is determined that the imaging unit 4 has received light from LED 17 of the master camera 1 (YES at step SB204), the controlling unit 3 of the slave camera 2 suspends the moving image reproducing operation (step SB207). Therefore, the user operates the shutter key when needed to suspend the moving-image reproducing operations of the same moment by the master and slave cameras and can check his/her golf-club swinging motion in three dimensions.

Thereafter, the controlling unit 3 of the slave camera 2 judges whether the reproducing operation of the moving image data has finished (step SB206). When the reproducing operation of the moving image data has not yet finished (NO at step SB206), the controlling unit 3 repeatedly performs the processes at step SB203 to step SB206 until it is determined that the reproducing operation of the moving image data has finished (YES at step SB206). When it is determined that the reproducing operation of the moving image data has finished (YES at step SB206), the process of FIG. 8B finishes.

In the present embodiment, the moving image shot by the master camera 1 is reproduced on the master camera 1 and the moving image shot by the slave camera 2 is reproduced on the slave camera 2. But after shooting and storing the moving image in the image recording unit 10 in the slave camera 2, it is possible to remove said recording unit 10 from the slave camera 2 and to install said recording unit 10 onto the master camera 1. Then, the two moving images shot respectively by the master and slave cameras 1, 2 are reproduced in synchronization on separated screens of the displaying unit 9 of the master camera 1, allowing the user to evaluate his/her swinging motion in three dimensions without using the specified moving image reproducing apparatus.

In the present embodiments of the invention, the imaging unit 4 receives light from LED 17, and therefore the imaging unit 4 can be also used as a detecting unit for detecting on-off timing of LED 17.

In the camera system according to the present embodiments of the invention, the master and slave cameras 1, 2 have the same configuration, but it is possible to provide the light emitting unit such as LED only on the master camera 1, which allows to compose the slave camera 2 simple in configuration.

What is claimed is:

1. A camera comprising:
   an imaging element for taking a picture to obtain an image;
   a detecting unit which detects a timing of blinking of light based on a timing of variation in luminance of an image obtained by the imaging element, wherein the light blinks periodically at a reference timing and the image is taken by the imaging element under a condition that the light blinks periodically at the reference timing; and
   an adjusting unit which adjusts a timing of exposure of the imaging element, based on the timing of blinking of light detected by the detecting unit,
   wherein the detecting unit detects the timing of blinking of light which blinks at the reference timing, based on a timing of variation in luminance of line images corresponding to particular lines respectively included in plural frames serially taken by the imaging element, each of the plural frames including at least one of said particular lines.

2. The camera according to claim 1, wherein said variation in luminance is caused due to an inconsistency between an emitting period of the light blinking at the reference timing and an exposure period of the imaging element.

3. The camera according to claim 2, wherein
   the adjusting unit adjusts the timing of exposure of the imaging element such that an inconsistency in time between the timing of blinking of light detected by the detecting unit and the timing of exposure of the imaging element will be a predetermined time or less.

4. The camera according to claim 3, wherein
   the imaging element serially exposes lines in one frame to light with a timing delayed by a predetermined time, thereby outputting the line images.

5. The camera according to claim 4, wherein
   the detecting unit further detects the timing of blinking of the light blinking at the reference timing, based on a timing of variation in luminance of a specific line image from among plural line images obtained by serially shooting lines included in one frame, which variation in luminance is caused due to the inconsistency between an emitting period of the light blinking at the reference timing and an exposure period of the imaging element,
   wherein timings of variation in luminance of the plural line images are different from each other.

6. The camera according to claim 5, wherein
   the detecting unit for detecting the timing of blinking of light is the imaging element.

7. The camera according to claim 1, wherein
   the variation in luminance is caused by an inconsistent amount between one emitting period of the blinking light and one exposure period of the imaging element, which inconsistent amount is caused due to inconsistency between an emitting cycle of the emitting light and an exposure cycle of the imaging element and varies every frame shooting operation.

8. The camera according to claim 1, wherein
   the adjusting unit adjusts the timing of exposure of the imaging element such that an inconsistency in time between the timing of blinking of light detected by the detecting unit and the timing of exposure of the imaging element will be a predetermined time decided based on a line position of the particular line in the frame.

9. The camera according to claim 8, further comprising:
   a synchronizing signal generating unit which generates a frame synchronizing signal which is used as a reference for the timing of exposure of the imaging element,
   wherein:
   the imaging element receives the frame synchronizing signal generated by the synchronizing signal generating unit as the reference to serially output the plural line images with a timing of an exposure period of a line image properly varied depending on a line position within one frame, and
   the adjusting unit adjusts a timing of generation of the frame synchronizing signal to be generated by the synchronizing signal generating unit such that a timing of exposure of the particular line by the imaging element and the timing of blinking of light detected by the detecting unit will coincide with each other.

10. The camera according to claim 9, wherein
    the particular line is the line located at a center of a frame, and is inconsistent in time by a half period with an exposure period of a leading line indicated by the frame synchronizing signal and with an emitting period of the light blinking at the reference timing.

11. The camera according to claim 1, wherein:
    the light blinks in synchronization with the reference timing which is inconsistent by a previously determined time with a timing of exposure of an imaging element of another camera used together with the present camera for imaging an object, and
    the adjusting unit adjusts the timing of exposure of the imaging element of the present camera based on the timing of blinking detected by the detecting unit such that the timing of exposure of the imaging element of the present camera will coincide with the timing of exposure of the imaging element of the other camera in consideration of an inconsistency in time between the timing of exposure of the imaging element of the other camera and the reference timing.

12. The camera according to claim 11, wherein
    the light is emitted from the other camera, and the detecting unit detects a timing of blinking of the light emitted from the other camera.

13. The camera according to claim 11, wherein:
    the imaging element serially exposes lines in one frame to light with a timing delayed by a predetermined time, thereby outputting the line images,
    the detecting unit further detects variation in luminance of the line images output from the imaging element for the respective plural frames, which variation is caused due to a relative difference in time between the timing of blinking of light from the other camera and a timing of line exposure of the present camera, and
    the adjusting unit adjusts relative inconsistency between the timing of exposure of the imaging element of the present camera and the timing of blinking of light of the other camera, based on the variation detected by detecting unit, such that the timing of line exposure of the present camera coincides with a timing of line exposure of the other camera.

14. The camera according to claim 13, wherein the adjusting unit adjusts the inconsistency between the timing of blinking of light and the timing of exposure of the imaging element such that the luminance of line images detected by the detecting unit will be maximized.

15. The camera according to claim 13, wherein the detecting unit detects variation in luminance of the line images, which variation is caused due to relative difference in time envisaged from a condition of blinking of light and a condition of the line exposures, and the adjusting unit specifies a relative difference in time corresponding to the variation in luminance of the line images detected by the detecting unit to adjust the specified difference in time as the inconsistency in the timing of exposure of the imaging element.

16. The camera according to claim 13, wherein the detecting unit detects variation in luminance of line images which are obtained under multiple line exposures relatively inconsistent in time with the timing of blinking of light, and the adjusting unit specifies a relative difference in time corresponding to the variation in luminance of the line images detected by the detecting unit to adjust the specified difference in time as the inconsistency in the timing of exposure of the imaging element.

17. The camera according to claim 16, wherein one period of the blinking of light is equivalent to a period of line exposure or less.

18. The camera according to claim 16, wherein the multiple line exposures are performed on lines located at same line positions respectively in plural frames.

19. The camera according to claim 16, wherein the timing of blinking of light is a cycle of shooting by the imaging element for a line exposure, and also a timing late by a half cycle in phase for a shooting timing to be finally adjusted.

20. The camera according to claim 16, wherein the adjusting unit adjusts the timing of exposure of the imaging element, while varying a shooting cycle so as to minimize the variation in luminance of the line images in the frame.

21. The camera according to claim 1, wherein the imaging element repeatedly exposes to obtain temporally continuous frame images.

22. A method of controlling a shooting operation in a camera, which has an imaging element for taking a picture to obtain an image, the method comprising:
detecting a timing of blinking of light based on a timing of variation in luminance of an image obtained by the imaging element, wherein the light blinks periodically at a reference timing and the image is taken by the imaging element under a condition that the light blinks periodically at the reference timing; and
adjusting a timing of exposure of the imaging element based on the timing of blinking of light detected in the detecting step,
wherein the detecting comprises detecting the timing of blinking of light which blinks at the reference timing, based on a timing of variation in luminance of line images corresponding to particular lines respectively included in plural frames serially taken by the imaging element, each of the plural frames including at least one of said particular lines.

23. A camera system comprising:
plural cameras, each having an imaging element for taking a picture to obtain an image, wherein:
a particular camera among the plural cameras includes a light emitting unit for emitting light blinking periodically at a reference timing; and
the plural cameras except the particular camera comprise:
a detecting unit which detects a blinking timing of light based on a timing of variation in luminance of an image obtained by the imaging element, wherein the light blinks periodically at the reference timing and the image is taken by the imaging element under a condition of the light blinking periodically at the reference timing; and
an adjusting unit which adjusts a timing of exposure of the imaging element, based on the timing of blinking of light detected by the detecting unit,
wherein the detecting unit detects the timing of blinking of light which blinks at the reference timing, based on a timing of variation in luminance of line images corresponding to particular lines respectively included in plural frames serially taken by the imaging element, each of the plural frames including at least one of said particular lines.

24. The camera system including plural cameras according to claim 23, wherein
the light emitting unit of the particular camera blinks light in synchronization with the timing of exposure of the imaging element.

25. The camera system according to claim 23, wherein the imaging element serially exposes lines within one frame to light with a timing delayed by a predetermined time, thereby outputting the line images, and the adjusting unit of the plural cameras except the particular camera adjusts the timing of exposure of the imaging element such that the variation in luminance of the line images from the respective plural frames will be brought into a predetermined state, while altering a cycle or timing of the shooting operation.

26. A non-transitory computer-readable storage medium having stored thereon a program that is executable by a computer mounted on a camera, wherein the camera has an imaging element for taking a picture to obtain an image, and by the program being executable by the computer to cause the computer to implement functions of:
a detecting unit which detects a timing of blinking of light based on a timing of variation in luminance of an image obtained by the imaging element, wherein the light blinks periodically at a reference timing and the image is taken by the imaging element under a condition that the light blinks periodically at the reference timing; and
an adjusting unit which adjusts a timing of exposure of the imaging element, based on the timing of blinking of light detected by the detecting unit,
wherein the detecting unit detects the timing of blinking of light which blinks at the reference timing, based on a timing of variation in luminance of line images corresponding to particular lines respectively included in plural frames serially taken by the imaging element, each of the plural frames including at least one of said particular lines.

* * * * *